United States Patent
Hymus et al.

(10) Patent No.: US 9,516,069 B2
(45) Date of Patent: Dec. 6, 2016

(54) PACKET HEADERS AS A TRIGGER FOR AUTOMATIC ACTIVATION OF SPECIAL-PURPOSE SOFTPHONE APPLICATIONS

(75) Inventors: Francis C. Hymus, Bridgewater, NJ (US); Paul Roller Michaelis, Louisville, CO (US); Richard Alan Windhausen, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1234 days.

(21) Appl. No.: 12/620,428

(22) Filed: Nov. 17, 2009

(65) Prior Publication Data
US 2011/0116505 A1    May 19, 2011

(51) Int. Cl.
*H04L 29/06* (2006.01)

(52) U.S. Cl.
CPC ....... *H04L 65/1069* (2013.01); *H04L 65/4007* (2013.01)

(58) Field of Classification Search
None
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,754,335 A | 6/1988 | Izawa et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |

(Continued)

FOREIGN PATENT DOCUMENTS

| | | |
|---|---|---|
| CA | 2143198 | 1/1995 |
| CA | 2174762 | 6/1995 |

(Continued)

OTHER PUBLICATIONS

Michaelis, U.S. Appl. No. 12/569,581, Entitled "Automatic Configuration of Soft Phones That Are Usable in Conjunction With Special-Purpose Endpoints", filed Sep. 29, 2009.

(Continued)

*Primary Examiner* — Andrew Oh
(74) *Attorney, Agent, or Firm* — Sheridan Ross P.C.

(57) ABSTRACT

Methods, devices, and systems for automatically controlling the activation and/or deactivation of communication applications are provided. More specifically, methods, devices, and systems are provided such that the inspection of communication packet headers can be leveraged as a trigger for automatically activating and/or deactivating communication applications and the population of a corresponding user-interface to the application.

5 Claims, 5 Drawing Sheets

(56) References Cited

U.S. PATENT DOCUMENTS

| | | |
|---|---|---|
| 5,267,302 A | 11/1993 | Kotani et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,513,212 A | 4/1996 | Bremer |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,673,205 A | 9/1997 | Brunson |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,781,614 A | 7/1998 | Brunson |
| 5,784,452 A | 7/1998 | Carney |
| 5,787,410 A | 7/1998 | McMahon |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |

(56) References Cited

U.S. PATENT DOCUMENTS

| | | | |
|---|---|---|---|
| 6,298,062 | B1 | 10/2001 | Gardell et al. |
| 6,307,931 | B1 | 10/2001 | Vaudreuil |
| 6,324,282 | B1 | 11/2001 | McIllwaine et al. |
| 6,332,081 | B1 | 12/2001 | Do |
| 6,339,754 | B1 | 1/2002 | Flanagan et al. |
| 6,353,810 | B1 | 3/2002 | Petrushin |
| 6,356,632 | B1 | 3/2002 | Foster et al. |
| 6,360,222 | B1 | 3/2002 | Quinn |
| 6,366,666 | B2 | 4/2002 | Bengtson et al. |
| 6,366,668 | B1 | 4/2002 | Borst et al. |
| 6,381,253 | B1 | 4/2002 | Benayoun et al. |
| 6,389,028 | B1 | 5/2002 | Bondarenko et al. |
| 6,389,132 | B1 | 5/2002 | Price et al. |
| 6,389,400 | B1 | 5/2002 | Bushey et al. |
| 6,408,066 | B1 | 6/2002 | Andruska et al. |
| 6,408,277 | B1 | 6/2002 | Nelken |
| 6,411,682 | B1 | 6/2002 | Fuller et al. |
| 6,424,709 | B1 | 7/2002 | Doyle et al. |
| 6,426,950 | B1 | 7/2002 | Mistry |
| 6,427,137 | B2 | 7/2002 | Petrushin |
| 6,430,282 | B1 | 8/2002 | Bannister et al. |
| 6,434,230 | B1 | 8/2002 | Gabriel |
| 6,446,092 | B1 | 9/2002 | Sutter |
| 6,449,356 | B1 | 9/2002 | Dezonno |
| 6,449,358 | B1 | 9/2002 | Anisimov et al. |
| 6,449,646 | B1 | 9/2002 | Sikora et al. |
| 6,453,038 | B1 | 9/2002 | McFarlane et al. |
| 6,463,148 | B1 | 10/2002 | Brady |
| 6,463,346 | B1 | 10/2002 | Flockhart et al. |
| 6,463,415 | B2 | 10/2002 | St. John |
| 6,463,471 | B1 | 10/2002 | Dreke et al. |
| 6,480,826 | B2 | 11/2002 | Pertrushin |
| 6,490,350 | B2 | 12/2002 | McDuff et al. |
| 6,493,558 | B1 | 12/2002 | Bernhart et al. |
| 6,535,600 | B1 | 3/2003 | Fisher et al. |
| 6,535,601 | B1 | 3/2003 | Flockhart et al. |
| 6,553,114 | B1 | 4/2003 | Fisher et al. |
| 6,556,974 | B1 | 4/2003 | D'Alessandro |
| 6,560,330 | B2 | 5/2003 | Gabriel |
| 6,560,649 | B1 | 5/2003 | Mullen et al. |
| 6,560,707 | B2 | 5/2003 | Curtis et al. |
| 6,563,920 | B1 | 5/2003 | Flockhart et al. |
| 6,563,921 | B1 | 5/2003 | Williams et al. |
| 6,571,285 | B1 | 5/2003 | Groath et al. |
| 6,574,599 | B1 | 6/2003 | Lim et al. |
| 6,574,605 | B1 | 6/2003 | Sanders et al. |
| 6,597,685 | B2 | 7/2003 | Miloslavsky et al. |
| 6,603,854 | B1 | 8/2003 | Judkins et al. |
| 6,604,084 | B1 | 8/2003 | Powers et al. |
| 6,614,903 | B1 | 9/2003 | Flockhart et al. |
| 6,650,748 | B1 | 11/2003 | Edwards et al. |
| 6,662,188 | B1 | 12/2003 | Rasmussen et al. |
| 6,668,167 | B2 | 12/2003 | McDowell et al. |
| 6,675,168 | B2 | 1/2004 | Shapiro et al. |
| 6,684,192 | B2 | 1/2004 | Honarvar et al. |
| 6,697,457 | B2 | 2/2004 | Petrushin |
| 6,700,967 | B2 | 3/2004 | Kleinoder et al. |
| 6,704,409 | B1 | 3/2004 | Dilip et al. |
| 6,707,903 | B2 | 3/2004 | Burok et al. |
| 6,711,253 | B1 | 3/2004 | Prabhaker |
| 6,724,885 | B1 | 4/2004 | Deutsch et al. |
| 6,735,299 | B2 | 5/2004 | Krimstock et al. |
| 6,735,593 | B1 | 5/2004 | Williams |
| 6,738,462 | B1 | 5/2004 | Brunson |
| 6,744,877 | B1 | 6/2004 | Edwards |
| 6,754,333 | B1 | 6/2004 | Flockhart et al. |
| 6,757,362 | B1 | 6/2004 | Cooper et al. |
| 6,766,013 | B2 | 7/2004 | Flockhart et al. |
| 6,766,014 | B2 | 7/2004 | Flockhart et al. |
| 6,766,326 | B1 | 7/2004 | Cena |
| 6,773,827 | B2 | 8/2004 | Higuchi |
| 6,775,377 | B2 | 8/2004 | McIllwaine et al. |
| 6,785,666 | B1 | 8/2004 | Nareddy et al. |
| 6,798,767 | B1 | 9/2004 | Alexander et al. |
| 6,822,945 | B2 | 11/2004 | Petrovykh |
| 6,829,348 | B1 | 12/2004 | Schroeder et al. |
| 6,839,735 | B2 | 1/2005 | Wong et al. |
| 6,842,503 | B1 | 1/2005 | Wildfeuer |
| 6,847,973 | B2 | 1/2005 | Griffin et al. |
| 6,898,190 | B2 | 5/2005 | Shtivelman et al. |
| 6,914,964 | B1 | 7/2005 | Levine |
| 6,915,305 | B2 | 7/2005 | Subramanian et al. |
| 6,947,543 | B2 | 9/2005 | Alvarado et al. |
| 6,947,988 | B1 | 9/2005 | Saleh |
| 6,963,826 | B2 | 11/2005 | Hanaman et al. |
| 6,968,052 | B2 | 11/2005 | Wullert, II |
| 6,981,061 | B1 | 12/2005 | Sakakura |
| 6,985,901 | B1 | 1/2006 | Sachse et al. |
| 6,988,126 | B2 | 1/2006 | Wilcock et al. |
| 7,010,542 | B2 | 3/2006 | Trappen et al. |
| 7,020,254 | B2 | 3/2006 | Phillips |
| 7,035,808 | B1 | 4/2006 | Ford |
| 7,035,927 | B2 | 4/2006 | Flockhart et al. |
| 7,039,176 | B2 | 5/2006 | Borodow et al. |
| 7,054,434 | B2 | 5/2006 | Rodenbusch et al. |
| 7,062,031 | B2 | 6/2006 | Becerra et al. |
| 7,076,051 | B2 | 7/2006 | Brown et al. |
| 7,100,200 | B2 | 8/2006 | Pope et al. |
| 7,103,562 | B2 | 9/2006 | Kosiba et al. |
| 7,110,525 | B1 | 9/2006 | Heller et al. |
| 7,117,193 | B1 | 10/2006 | Basko et al. |
| 7,127,058 | B2 | 10/2006 | O'Connor et al. |
| 7,136,873 | B2 | 11/2006 | Smith et al. |
| 7,149,733 | B2 | 12/2006 | Lin et al. |
| 7,151,820 | B2 | 12/2006 | Vejlgaard |
| 7,155,612 | B2 | 12/2006 | Licis |
| 7,158,628 | B2 | 1/2007 | McConnell et al. |
| 7,162,469 | B2 | 1/2007 | Anonsen et al. |
| 7,165,075 | B2 | 1/2007 | Harter et al. |
| 7,170,976 | B1 | 1/2007 | Keagy |
| 7,170,992 | B2 | 1/2007 | Knott et al. |
| 7,174,004 | B1 | 2/2007 | Michaelis |
| 7,177,401 | B2 | 2/2007 | Mundra et al. |
| 7,200,219 | B1 | 4/2007 | Edwards et al. |
| 7,203,655 | B2 | 4/2007 | Herbert et al. |
| 7,212,622 | B2 | 5/2007 | Delaney et al. |
| 7,212,625 | B1 | 5/2007 | McKenna et al. |
| 7,215,744 | B2 | 5/2007 | Scherer |
| 7,218,626 | B2 | 5/2007 | Shaheen et al. |
| 7,222,075 | B2 | 5/2007 | Petrushin |
| 7,246,371 | B2 | 7/2007 | Diacakis et al. |
| 7,248,565 | B1 | 7/2007 | Fourie |
| 7,257,513 | B2 | 8/2007 | Lilly |
| 7,257,597 | B1 | 8/2007 | Pryce et al. |
| 7,266,508 | B1 | 9/2007 | Owen et al. |
| 7,283,805 | B2 | 10/2007 | Agrawal |
| 7,295,669 | B1 | 11/2007 | Denton et al. |
| 7,299,259 | B2 | 11/2007 | Petrovykh |
| 7,324,954 | B2 | 1/2008 | Calderaro et al. |
| 7,336,779 | B2 | 2/2008 | Boyer et al. |
| 7,340,408 | B1 | 3/2008 | Drew et al. |
| 7,373,341 | B2 | 5/2008 | Polo-Malouvier |
| 7,376,127 | B2 | 5/2008 | Hepworth et al. |
| 7,386,100 | B2 | 6/2008 | Michaelis |
| 7,392,402 | B2 | 6/2008 | Suzuki |
| 7,409,423 | B2 | 8/2008 | Horvitz et al. |
| 7,415,417 | B2 | 8/2008 | Boyer et al. |
| 7,418,093 | B2 | 8/2008 | Knott et al. |
| 7,468,983 | B2 | 12/2008 | Requena et al. |
| 7,499,844 | B2 | 3/2009 | Whitman, Jr. |
| 7,500,241 | B1 | 3/2009 | Flockhart et al. |
| 7,512,984 | B2* | 3/2009 | Lee .................. H04L 12/581 709/206 |
| 7,526,440 | B2 | 4/2009 | Walker et al. |
| 7,532,628 | B2 | 5/2009 | Lepore et al. |
| 7,545,761 | B1 | 6/2009 | Kalbag |
| 7,545,925 | B2 | 6/2009 | Williams |
| 7,567,653 | B1* | 7/2009 | Michaelis .................. 379/52 |
| 7,711,104 | B1 | 5/2010 | Flockhart et al. |
| 7,734,032 | B1 | 6/2010 | Kiefhaber |
| 7,773,525 | B2* | 8/2010 | Fujino .................. H04L 45/02 370/238 |
| 7,779,042 | B1 | 8/2010 | Bland et al. |
| 7,787,609 | B1 | 8/2010 | Flockhart et al. |

(56) References Cited

U.S. PATENT DOCUMENTS

| | | | |
|---|---|---|---|
| 7,809,125 B2* | 10/2010 | Brunson et al. | 379/221.01 |
| 7,822,587 B1 | 10/2010 | Krimstock et al. | |
| 7,885,209 B1 | 2/2011 | Michaelis et al. | |
| 7,936,867 B1 | 5/2011 | Hill et al. | |
| 7,944,870 B2* | 5/2011 | Varland | 370/313 |
| 7,978,827 B1 | 7/2011 | Becker et al. | |
| 8,000,989 B1 | 8/2011 | Kiefhaber | |
| 8,059,656 B1 | 11/2011 | Telikepalli et al. | |
| 8,094,664 B2 | 1/2012 | Kuure et al. | |
| 8,264,965 B2* | 9/2012 | Dolganow | H04L 47/10 370/235 |
| 2001/0011228 A1 | 8/2001 | Shenkman | |
| 2001/0034628 A1 | 10/2001 | Eder | |
| 2002/0019829 A1 | 2/2002 | Shapiro | |
| 2002/0021307 A1 | 2/2002 | Glenn et al. | |
| 2002/0035605 A1 | 3/2002 | McDowell et al. | |
| 2002/0038422 A1 | 3/2002 | Suwamoto et al. | |
| 2002/0065894 A1 | 5/2002 | Dalal et al. | |
| 2002/0076010 A1 | 6/2002 | Sahai | |
| 2002/0085701 A1 | 7/2002 | Parsons et al. | |
| 2002/0087630 A1 | 7/2002 | Wu | |
| 2002/0112186 A1 | 8/2002 | Ford et al. | |
| 2002/0116336 A1 | 8/2002 | Diacakis et al. | |
| 2002/0116461 A1 | 8/2002 | Diacakis et al. | |
| 2002/0123923 A1 | 9/2002 | Manganaris et al. | |
| 2002/0147730 A1 | 10/2002 | Kohno | |
| 2002/0194096 A1 | 12/2002 | Falcone et al. | |
| 2003/0004704 A1 | 1/2003 | Baron | |
| 2003/0028621 A1 | 2/2003 | Furlong et al. | |
| 2003/0073440 A1 | 4/2003 | Mukherjee et al. | |
| 2003/0108186 A1 | 6/2003 | Brown et al. | |
| 2003/0142200 A1* | 7/2003 | Canova et al. | 348/14.08 |
| 2003/0144900 A1 | 7/2003 | Whitmer | |
| 2003/0144959 A1 | 7/2003 | Makita | |
| 2003/0231757 A1 | 12/2003 | Harkreader et al. | |
| 2004/0008828 A1 | 1/2004 | Coles et al. | |
| 2004/0015496 A1 | 1/2004 | Anonsen | |
| 2004/0015506 A1 | 1/2004 | Anonsen et al. | |
| 2004/0052243 A1 | 3/2004 | Bostrom et al. | |
| 2004/0054743 A1 | 3/2004 | McPartlan et al. | |
| 2004/0057569 A1 | 3/2004 | Busey et al. | |
| 2004/0095938 A1 | 5/2004 | Ryu | |
| 2004/0102940 A1 | 5/2004 | Lendermann et al. | |
| 2004/0103324 A1 | 5/2004 | Band | |
| 2004/0138944 A1 | 7/2004 | Whitacre et al. | |
| 2004/0162998 A1 | 8/2004 | Tuomi et al. | |
| 2004/0193646 A1 | 9/2004 | Cuckson et al. | |
| 2004/0196961 A1 | 10/2004 | Freundlich et al. | |
| 2004/0202308 A1 | 10/2004 | Baggenstoss et al. | |
| 2004/0202309 A1 | 10/2004 | Baggenstoss et al. | |
| 2004/0203878 A1 | 10/2004 | Thomson | |
| 2004/0210475 A1 | 10/2004 | Starnes et al. | |
| 2004/0240659 A1 | 12/2004 | Gagle et al. | |
| 2004/0249650 A1 | 12/2004 | Freedman et al. | |
| 2004/0260706 A1 | 12/2004 | Anonsen et al. | |
| 2005/0021529 A1 | 1/2005 | Hodson et al. | |
| 2005/0044375 A1 | 2/2005 | Paatero et al. | |
| 2005/0049911 A1 | 3/2005 | Engelking et al. | |
| 2005/0065837 A1 | 3/2005 | Kosiba et al. | |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2005/0091071 A1 | 4/2005 | Lee | |
| 2005/0125432 A1 | 6/2005 | Lin et al. | |
| 2005/0125458 A1 | 6/2005 | Sutherland et al. | |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0228707 A1 | 10/2005 | Hendrickson | |
| 2005/0261035 A1 | 11/2005 | Groskreutz et al. | |
| 2005/0283393 A1 | 12/2005 | White et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0015388 A1 | 1/2006 | Flockhart et al. | |
| 2006/0026049 A1 | 2/2006 | Joseph et al. | |
| 2006/0056598 A1 | 3/2006 | Brandt et al. | |
| 2006/0058049 A1 | 3/2006 | McLaughlin et al. | |
| 2006/0100973 A1 | 5/2006 | McMaster et al. | |
| 2006/0135058 A1 | 6/2006 | Karabinis | |
| 2006/0167667 A1 | 7/2006 | Maturana et al. | |
| 2006/0178994 A1 | 8/2006 | Stolfo et al. | |
| 2006/0187900 A1* | 8/2006 | Akbar | 370/352 |
| 2006/0242160 A1 | 10/2006 | Kanchwalla et al. | |
| 2006/0256957 A1 | 11/2006 | Fain et al. | |
| 2006/0271418 A1 | 11/2006 | Hackbarth et al. | |
| 2006/0285648 A1 | 12/2006 | Wahl et al. | |
| 2007/0038632 A1 | 2/2007 | Engstrom | |
| 2007/0064912 A1 | 3/2007 | Kagan et al. | |
| 2007/0083572 A1 | 4/2007 | Bland et al. | |
| 2007/0112953 A1 | 5/2007 | Barnett | |
| 2007/0127643 A1 | 6/2007 | Keagy | |
| 2007/0156375 A1 | 7/2007 | Meier et al. | |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1 | 3/2008 | Petrovykh | |
| 2009/0193050 A1 | 7/2009 | Olson | |
| 2009/0228474 A1 | 9/2009 | Chiu et al. | |
| 2009/0239519 A1* | 9/2009 | Fujino | 455/419 |
| 2010/0235371 A1 | 9/2010 | Bland et al. | |

FOREIGN PATENT DOCUMENTS

| | | | |
|---|---|---|---|
| EP | 0501189 | 9/1992 | |
| EP | 0576205 | 12/1993 | |
| EP | 0740450 | 10/1996 | |
| EP | 0770967 | 5/1997 | |
| EP | 0772335 | 5/1997 | |
| EP | 0829996 | 3/1998 | |
| EP | 0855826 | 7/1998 | |
| EP | 0863651 | 9/1998 | |
| EP | 0866407 | 9/1998 | |
| EP | 0899673 | 3/1999 | |
| EP | 0998108 | 5/2000 | |
| EP | 1035718 | 9/2000 | |
| EP | 1091307 | 4/2001 | |
| EP | 1150236 | 10/2001 | |
| EP | 1761078 | 3/2007 | |
| EP | 1924094 | * 5/2008 | H04N 7/14 |
| EP | 2071817 | * 6/2009 | H04M 3/42 |
| GB | 2273418 | 6/1994 | |
| GB | 2290192 | 12/1995 | |
| JP | 07-007573 | 1/1995 | |
| JP | 2000-224333 | 8/2000 | |
| JP | 2001-053843 | 2/2001 | |
| JP | 2002-032977 | 1/2002 | |
| JP | 2002-274054 | 9/2002 | |
| JP | 2002-304313 | 10/2002 | |
| JP | 2006-054864 | 2/2006 | |
| WO | WO 96/07141 | 3/1996 | |
| WO | WO 97/28635 | 8/1997 | |
| WO | WO 98/56207 | 12/1998 | |
| WO | WO 99/17522 | 4/1999 | |
| WO | WO 00/26804 | 5/2000 | |
| WO | WO 00/26816 | 5/2000 | |
| WO | WO 01/19096 | 3/2001 | |
| WO | WO 01/80094 | 10/2001 | |
| WO | WO 02/099640 | 12/2002 | |
| WO | WO 03/015425 | 2/2003 | |
| WO | WO 03/032601 | 4/2003 | |
| WO | WO 2007/062418 | 5/2007 | |

OTHER PUBLICATIONS

Burritt et al., U.S. Appl. No. 11/956,779, Entitled "Arrangement for Dynamically Diverting Communications Having Characteristics Incompatible With a Communication Device to Another Device", filed Dec. 14, 2007.

"3rd Generation Partnership Project; Technical Specification Group Services and System Aspects; IP Multimedia Subsystem (IMS)

(56) References Cited

OTHER PUBLICATIONS service continuity enhancements; Service, policy and interaction; Stage 2 (Release 9)," 3GPP Partnership Project, Standard TR 23.838 V1.1.0, Apr. 2009, 54 pages.
Extended European Search Report for European Patent Application No. 10181556.1, dated May 9, 2011.
US 6,537,685, 3/2003, Fisher et al. (withdrawn).
U.S. Appl. No. 10/815,566, filed Mar. 31, 2004, Kiefhaber.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick et al.
U.S. Appl. No. 12/242,916, filed Oct. 1, 2008, Kiefhaber et al.
Creating and Using Data Warehouse Dimension Tables (Microsoft) copyright 2005, http://msdn.microsoft.com/library/en-us/createdw/createdw_10kz.asp?frame=true, 3 pages.
Creating and Using Data Warehouse-Using Dimensional Modeling (Microsoft) downloaded May 18, 2005 http://msdn.microsoft.com/library/en-us/createdw/createdw_39z.asp?frame=true 1 page.
Definity Communications System Generic 3 Call Vectoring/Expert Agent Selection (EAS) Guide, AT&T Publication No. 555-230-520, Sep. 1995, Issue 4, 458 pages.
"Intelligent CallRouter™," GEOTEL Communications Corporation Web site printout, 1998, 6 pages.
Microsoft Office Animated Help Tool, date unknown, 1 page.
Schulzrinne et al., "RFC 2833: RTP Payload for DTMF Digits, Telephony Tones and Telephony Signals," Network Working Group, May 2000, available at http://www.faqs.org/rfcs/rfc2833.html, 23 pages.
Hellstrom et al., RFC-4103 Protocol, entitled "RTP Payload for Text Conversation," Network Working Group, http://www.rfc-editor.org/rfc/rfc4103.txt, Jun. 2005, 18 pages.
"Avaya one-X Agent Release 1.0 Release Notes," Avaya Inc., Jun. 2009, 7 pages.
Kimball, "The Soul of the Data Warehouse, Part Three: Handling Time," Intelligent Enterprise Magazine, Data Warehouse Designer, Apr. 22, 2003, 3 pages.
"Learn the structure of an Access database," available at http://office.microsoft.com/en-us/access/HA012139541033.aspx, site updated Nov. 13, 2007, pp. 1-4.
Dillon, "Renaming fields and tracing dependencies," available at http://allenbrowne.com/ser-41.html, Nov. 2003, updated May 2006, 1 page.
"Access for 9-1-1 and Telephone Emergency Services," Americans with Disabilities Act, U.S. Department of Justice, Civil Rights Division, Jul. 15, 1998, available at http://www.usdoj.gov/crt/ada/911ta.htm, 11 pages.
"Analysis and Reporting," Aspect Communications, May 19, 2005, http://aspect.com/products/analysis/index.cfm, 1 page.
"Applications, NPRI's Predictive Dialing Package," Computer Technology, Fall 1993, p. 86.
"Avaya and Blue Pumpkin—Providing Workforce Optimization Solutions," Avaya Inc., May 2004, 3 pages.
"Avaya and Texas Digital Systems—Providing Real-time Access to Call Statistics," Avaya Inc., May 2004, 3 pages.
"Avaya Basic Call Management System Reporting Desktop," Avaya Inc., Jan. 2002, 4 pages.
"Avaya Call Management System," Avaya Inc., Oct. 2003, 3 pages.
"Avaya IQ—Building Upon the Strengths of CMS," Avaya White Paper, Feb. 2007, 11 pages.
"Avaya IQ: Introducing Reporting and Analytics as You Designed It," Avaya Inc., Feb. 2007, 4 pages.
"Avaya Multi Channel Product Authorization (PA)," Avaya Inc., Version 5.0, Nov. 2003, 6 pages.
"Basic Call Management System Reporting Desktop—Product Description," Avaya Inc., http://www.avaya.com/gcm/master-usa/en-us/products/offers/bcmrs_desktop.htm, printed May 19, 2005, copyright 2005, 2 pages.
"Basic Call Management System Reporting Desktop—Product Features," Avaya Inc., http://www.avaya.com/gcm/master-usa/en-us/products/offers/bcmrs_desktop.htm, printed May 19, 2005, copyright 2005, 2 pages.
"Basic Call Management System Reporting Desktop—Product Overview," Avaya Inc., http://www.avaya.com/gcm/master-usa/en-s/products/offers/bcmrs_desktop.htm, printed May 19, 2005, copyright 2005, 2 pages.
"Basic Call Management System Reporting Desktop—Product Technical," Avaya Inc., http://www.avaya.com/gcm/master-usa/en-us/products/offers/bcmrs_desktop.htm, printed May 19, 2005, copyright 2005, 2 pages.
"Better Implementation of IP in Large Networks," Avaya Inc., Apr. 2002, 14 pages.
"Business Advocate Options," Avaya, Inc., http://www.avaya.com, printed Feb. 15, 2003, 4 pages.
"Business Advocate Product Summary," Avaya, Inc., http://www.avaya.com, printed Feb. 15, 2003, 3 pages.
"Call Center Recording for Call Center Quality Assurance," Voice Print International, Inc., available at http://www.voiceprintonline.com/call-center-recording.asp?ad_src=google&srch_trm=call_center_monitoring, date unknown, printed May 10, 2007, 2 pages.
"Call Center Software You Can't Outgrow," Telemarketing®, Jul. 1993, p. 105.
"Call Management System—Product Description," Avaya Inc., http://www.avaya.com/gcm/master-usa/en-us/products/offers/call_management_system.htm, printed May 19, 2005, copyright 2005, 2 pages.
Call Management System—Product Features, Avaya Inc., http://www.avaya.com/gcm/master-usa/en-us/products/offers/call_management_system.htm, printed May 19, 2005, copyright 2005, 3 pages.
"Call Management System—Product Overview," Avaya Inc., http://www.avaya.com/gcm/master-usa/en-us/products/offers/call_management_system.htm, May 19, 2005, copyright 2005, 2 pages.
"Call Management System—Product Technical," Avaya Inc., http://www.avaya.com/gcm/master-usa/en-us/products/offers/call_management_system.htm, printed May 19, 2005, copyright 2005, 2 pages.
"CentreVu Advocate, Release 9, User Guide," Avaya, Inc., Dec. 2000, Issue 1, 293 pages.
"Centrex Internet Enabled Call Centers," Nortel, http://www.products.nortel.com/go/product_assoc.jsp?segId=0&parID=0&catID=-9191&rend_id . . . , copyright 1999-2005, printed May 19, 2005, 1 page.
"Chapter 9: Domain Name Services," available at http://www.pism.com/chapt09/chapt09.html, downloaded Mar. 31, 2003, 21 pages.
"Contact Center and Enterprise Products," NICE Systems, Insight from Interactions, http://www.nice.com/products/multimedia/contact_centers.php, printed May 19, 2005, 3 pages.
"CS 345: Topics in Data Warehousing," Oct. 5, 2004, 36 pages.
"Dimensional database," Wikipedia, downloaded Aug. 30, 2007, 3 pages.
"Driving Model Agent Behaviors With Avaya IQ," Avaya White Paper, Apr. 2007, 12 pages.
"eGain's Commerce 2000 Platform Sets New Standard for eCommerce Customer Communications," Business Wire, Nov. 15, 1999, 3 pages.
"Frequently Asked Questions—Domain Name Service FAQs," Bellsouth Corp., available at https://registration.bellsouth.net/NASApp/DNSWebUI/FAQ.jsp, printed Mar. 31, 2003, copyright 2002, 4 pages.
"Fundamentals of Data Warehousing—Unit 3—Dimensional Modeling, Fundamentals of Data Warehousing," Evolve Computer Solutions, copyright 2005, 55 pages.
"Internet Protocol Addressing," available at http://samspade.org/d/ipdns.html, downloaded Mar. 31, 2003, 9 pages.
"KANA—Contact Center Support," available at http://www.kana.com/solutions.php?tid=46, copyright 2006, printed May 10, 2007, 3 pages.
"Monitoring: OneSight Call Statistics Monitors," available at http://www.empirix.com/default.asp?action=article&ID=301, copyright 2007, printed May 10, 2007, 2 pages.

(56) References Cited

OTHER PUBLICATIONS

"Multi-Dimensional Modeling with BW ASAP for BW Accelerator Business Information Warehouse," SAP AG and SAP America, copyright 2000, 71 pages.
"NICE Analyzer™: Overwhelmed by the Amount of Data at your Contact Center?" NICE Systems, Insight from Interactions, http://www.nice.com/products/multimedia/analyzer.php, printed May 19, 2005, 2 pages.
"Oracle and Siebel," Oracle, available at http://www.oracle.com/siebel/index.html, printed May 10, 2007, 2 pages.
"Performance Optimization," Aspect Communications, May 19, 2005, http://aspect.com/products/wfm/performanceopt.cfm?section=performanceopt, 1page.
"Product Features," Guide to Call Center Automation, Brock Control Systems, Inc., Activity Managers Series™, Section 5—Company B120, Jun. 1992, p. 59.
"Product Features," Guide to Call Center Automation, CRC Information Systems, Inc., Tel-ATHENA, Section 5—Company C520, Jun. 1992, p. 95.
"Services for Computer Supported Telecommunications Applications (CSTA) Phase III," Standard ECMA-269, 5th Edition, Dec. 2002, ECMA International Standardizing Information and Communication Systems, pp. 1-666 (Parts 1-8).
"The Advantages of Load Balancing in the Multi-Call Center Enterprise," Avaya Inc. White Paper, Feb. 2002, 14 pages.
"VAST™, Voicelink Application Software for Teleservicing®," System Manager User's Guide, Digital Systems, 1994, pp. ii, vii-ix, 1-2, 2-41 through 2-77.
"Voice Over IP Via Virtual Private Networks: An Overview," Avaya Inc. White Paper, Feb. 2001, 9 pages.
"When Talk Isn't Cheap," Sm@rt Reseller, Apr. 3, 2000, vol. 3(13), p. 50.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Arslan et al., "Language Accent Classification in American English," Robust Speech Processing Laboratory, Duke University Department of Electrical Engineering, Durham, NC, Technical Report RSPL-96-7, revised Jan. 29, 1996, pp. 1-16.
Arslan, "Foreign Accent Classification in American English," Thesis submitted to Department of Electrical and Computer Engineering, Duke University, 1996, pp. 1-200.
Atkins et al, "Common Presence and Instant Messaging: Message Format," Network Working Group, Jan. 9, 2003, available at http://www.ietf.org/internet-drafts/draft-ietf-impp-cpim-msgfmt-08.txt, 31 pages.
Bentley, "Metadata: Everyone Talks About It, but What Is It?" Proceedings of the Twenty-Sixth Annual SAS Users Group International Conference: SAS Institute Inc., 2001, Paper 125-26, 5 pages.
Berners-Lee et al., "RFC 2396: Uniform Resource Identifiers (URI); Generic Syntax," Network Working Group, Aug. 1998, 38 pages.
Blog from "Road warrior and telecommuter-Community for Avaya Users," from http://www.avayausers.com/showthread.php?p=13430, earliest post date Nov. 21, 2006, printed on Sep. 15, 2009, 4 pages.
Boussaid et al., "Integration and dimensional modeling approaches for complex data warehousing," J. Global Optimization, vol. 37, No. 4, Apr. 2007, 2 pages.
Cabibbo et al., "An Architecture for Data Warehousing Supporting Data Independence and Interoperability," International Journal of Cooperative Information Systems, Nov. 2004, 41 pages.
Cahoon, "Fast Development of a Data Warehouse Using MOF, CWM and Code Generation," CubeModel, May 22, 2006, 32 pages.
Chavez et al., "Avaya MultiVantage Software: Adapting Proven Call Processing for the Transition to Converged IP Networks," Avaya, Inc., Aug. 2002, 20 pages.
Cherry, "Anger Management," IEEE Spectrum, Apr. 2005, p. 16.
Coles, Scott, "A Guide for Ensuring Service Quality in IP Voice Networks," Avaya, Inc., 2002, pp. 1-17.
Crocker et al., "Common Presence and Instant Messaging (CPIM)," Network Working Group, Aug. 14, 2002, available at http://www.ietf.org/internet-drafts/draft-ietf-impp-cpim-03.txt, 33 pages.
Cunningham, Lewis R., "My Personal Dictionary," An Expert's Guide to Oracle Technology, posted Mar. 31, 2005, http://blogs.ittoolbox.com/oracle'guide/archives003684.asp, 4 pages.
Curlingstone Publishing Glossary, http://www.curlingstone.com/7002/7002glossary.html, printed May 24, 2005, 11 pages.
Dawson et al., "RFC 2426: Vcard MIME Directory Profile," Network Working Group, Sep. 1998, available at http://www.ietf.org/rfc/rfc2426.txt?number=2426, 40 pages.
Dawson, "NPRI's Powerguide, Software Overview," Call Center Magazine, Jun. 1993, p. 85.
Day et al., "RFC 2778: A Model for Presence and Instant Messaging," Network Working Group, Feb. 2000, available at http://www.ietf.org/rfc/rfc2778.txt?number=2778, 16 pages.
Day et al., "RFC 2779: Instant Messaging/Presence Protocol Requirements," Network Working Group, Feb. 2000, available at http://www.ietf.org/rfc/rfc2779.txt?number=2779, 25 pages.
Durr, "Still Leaving It to Fate?: Optimizing Workforce Management," Customer Interaction Solutions, Nov. 2001, 5 pages.
Fielding et al., "RFC 2068: Hypertext Transfer Protocol—HTTP/1.1," Network Working Group, Jan. 1997, 152 pages.
Foster et al., "Avaya Business Advocate and its Relationship to Multi-Site Load Balancing Applications," Avaya, Inc., Mar. 2002, 14 pages.
Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom . . . , 1 page.
Gulbrandsen et al., "A DNS RR for Specifying the Location of Services (DNS SRV)," Network Working Group, Feb. 2000, available at http://www.ietf.org/rfc/rfc2782.txt?number=2782, 12 pages.
Hansen et al., "Foreign Accent Classification Using Source Generator Based Prosodic Features," IEEE Proc. ICASSP, May 1995, Detroit, MI, vol. 1, pp. 836-839.
Hellstrom et al., "RFC 2793: RTP Payload for Text Consersation," Network Working Group, May 2000, available at http://www.faqs.org/rfcs/rfc2793.html, 8 pages.
Holtman et al., "RFC 2296: HTTP Remote Variant Selection Algorithm—RVSA/1.0," Network Working Group, Mar. 1998, available at http://www.ietf.org/rfc/rfc2296.txt?number=2296, 13 pages.
Hotlman et al., "RFC 2295: Transparent Content Negotiation in HTTP," Network Working Group, Mar. 1998, available at http://www.ietf.org/rfc/rfc2295.txt?number=2295, 55 pages.
Karakasidis, A., "Queues for Active Data Warehousing," in Proceedings on Information Quality in Informational Systems (IQIS'2005), Jun. 17, 2005, Baltimore, MA, pp. 28-39, ISBN: 1-59593-160-0.
Kim et al., "Collaborative Multimedia Middleware Architecture and Advanced Internet Call Center," Proceedings at the International Conference on Information Networking, Jan. 31, 2001, pp. 246-250.
Kimball et al., The Data Warehouse ETL Toolkit: Practical Techniques for Extracting, Cleaning, Conforming, and Delivering Data, John Wiley & Sons, 2004, pp. 170-174.
Kimball et al., The Data Warehouse Toolkit: The Complete Guide to Dimensional Modeling, 2nd Edition, John Wiley & Sons, 2002, pp. 240-241, 260-262, 292-293.
Kimball, "An Engineer' s View: Its Worthwhile to Remind Ourselves Why We Build Data Warehouses the Way We Do," Intelligent Enterprise Magazine, Data Warehouse Designer, Jul. 26, 2002, 3 pages.
Kimball, "Design Constraints and Unavoidable Realities: No design Problem in school was this hard," Intelligent Enterprise Magazine, Data Warehouse Designer, Sep. 3, 2002, 3 pages.
Kimball, "Divide and Conquer: Build Your Data Warehouse One Piece at a Time," Intelligent Enterprise Magazine, Data Warehouse Designer, Oct. 30, 2002, 3 pages.

(56) References Cited

OTHER PUBLICATIONS

Kimball, "Fact Tables and Dimension," Intelligent Enterprise Magazine, Data Warehouse Designer, Jan. 1, 2003, http://www.inteeigententerprise.com/030101/602warehouse1_1.jhtml, 3 pages.
Kimball, "Surrogate Keys: Keep Control Over Record Identifiers by Generating New Keys for the Data Warehouse," DBMS Online, Data Warehouse Architect, May 1998, 4 pages.
Kimball, "TCO Starts with the End User: The conventional view of data warehouse total cost of ownership myopic and wrong," Intelligent Enterprise Magazine, Data Warehouse Designer, May 13, 2003, http://www.intelligententerprise.com/030513/608warehouse1_1.jhtml?_requestid=598425, 3 pages.
Kimball, "The Soul of the Data Warehouse, Part One: Drilling Down," Intelligent Enterprise Magazine, Data Warehouse Designer, Mar. 20, 2003, 3 pages.
Kimball, "The Soul of the Data Warehouse, Part Two: Drilling Across," Intelligent Enterprise Magazine, Data Warehouse Designer, Apr. 5, 2003, 3 pages.
Kimball, "Two Powerful Ideas, The Foundation for Modern Data Warehousing," Intelligent Enterprise Magazine, Data Warehouse Designer, Sep. 17, 2002, 3 pages.
Klyne, "RFC 2533: A Syntax for Describing Media Feature Sets," Network Working Group, Mar. 1999, available at http://www.ietf.org/rfc/rfc2533.txt?number=2533, 35 pages.
Klyne, "RFC 2703: Protocol-independent Content Negotiation Framework," Network Working Group, Sep. 1999, available at http://www.ietf.org/rfc/rfc2703.txt?number=2703, 19 pages.
Lamel et al., "Language Identification Using Phone-Based Acoustic Likelihood," IEEE International Conference on Acoustics, Speech, and Signal Processing, 1994, vol. 1, pp. 293-296.
Michael, "The Politics of Naming," www.cConvergence.com, Jul. 2001, pp. 31-35.
MIT Project Oxygen, Pervasive, Human-Centered Computing, MIT Laboratory for Computer Science, Jun. 2000, pp. 1-15.
Moss et al., "The Importance of Data Modeling as a Foundation for Business Insight," 2004, 38 pages.
Noth et al., "Research Issues for the Next Generation Spoken," University of Erlangen-Nuremberg, Bavarian Research Centre for Knowledge-Based Systems, at http://www5.informatik.uni-erlangen.de/literature/psdir/1999/Noeth99:RIF.ps.gz, 1999, 8 pages.
Overview of Avaya IP Softphone printed on Sep. 15, 2009 from http://support.avaya.com/elmodocs2/ip_softphone/Overview_IP_Softphone_R6.htm, 2 pages.
Presentation by Victor Zue, The MIT Oxygen Project, MIT Laboratory for Computer Science, Apr. 25-26, 2000, 9 pages.
Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age . . . , 1 page.
Product Description of "Avaya one-X Agent," printed on Sep. 15, 2009 from http://www.avaya.com/usa/product/avaya-one-x-agent, 1 page.
Product Overview of "IP Softphone" printed on Sep. 15, 2009 from http://www.nacr.com/Products.aspx?id=236, 3 pages.
Reeves, Laura, "Business Dimensional Modeling: The Logical Next Step: Translating the BDM," DM Review Magazine, May 2004, 4 pages.
Rose et al., "The APEX Presence Service," Network Working Group, Jan. 14, 2002, available at http://www.ietf.org/internet-drafts/draft-ietf-apex-presence-06.txt, 31 pages.
Sarda, "Temporal Issues in Data Warehouse Systems," Database Applications in Non-Traditional Environments (DANTE'99), 1999, S. 27, DOI: 10.1109/DANTE.1999.844938.
Schwarzkopf, A.B., "Dimensional Modeling for a Data Warehouse," date unknown, 18 pages.
Shockey, "ENUM: Phone Numbers Meet the Net," www.cConvergence.com, Jul. 2001, pp. 21-30.
Smith, "Data Model Overview: Modeling for the Enterprise While Serving the Individual," Teredata Global Sales Support, 2007, 33 pages.
Snape, "Time Dimension and Time Zones," at http://www.jamessnape.me.uk/blog/CommentView,gui,79e910a1-0150-4452-bda3-e98d, Aug. 7, 2004, 10 pages.
Songini, "ETL QuickStudy," ComputerWorld, accessed at http://www.computerworld.com/databasetopics/businessintelligence/datawarehouse/story/ . . . , Feb. 2, 2004, 5 pages.
Stevenson et al., "Name Resolution in Network and Systems Management Environments," http://netman.cit.buffalo.edu/Doc/DStevenson/NR-NMSE.html, printed Mar. 31, 2003, 16 pages.
Sugano et al., "Common Presence and Instant Messaging (CPIM) Presence Information Data Format," Network Working Group, Dec. 2002, available at http://www.ietf.org/internet-drafts/draft-ietf-impp-cpim-pidf-07.txt, 26 pages.
Vaisman et al., "A Temporal Query Language for OLAP: Implementation and a Case Study," LNCS, 2001, vol. 2397, 36 pages.
Veerman, E., "Designing a Dimensional Model," http://atlantamdf.com/Presentations/AtlantaMDF_091106.pdf, printed Aug. 30, 2007, 38 pages.
Watkins, Thayer, "Cost Benefit Analysis," San Jose State University Economics Department, 1999, Web Archive http://web.arch ive.org/web/19990225143131/http://www.sjsu.edu/faculty/watkins/cba.htm, 13 pages.
Wiederhold, "Mediation to Deal with Heterogeneous Data Sources," Stanford University, Jan. 1999, 19 pages.
Wilson Christopher Lamb: "DTMF to TTY gateway", Research Disclosure, Mason Publications, Hampshire, GB, vol. 462, No. 46, Oct. 1, 2002, ISSN: 0374-4353.
Zmolek, "Simple and Presence: Enterprise Value Propositions," Avaya presentation, presented Jan. 24, 2002, 16 pages.
"Call Center Reports," Aspect Communications, May 19, 2005, http://aspect.com/products/analysis/ccreporting.cfm, 2 pages.
Venkatesan et al., "A Customer Lifetime Value Framework for Customer Selection and Resource Allocation Strategy," Journal of Marketing, Oct. 2004, vol. 68, pp. 106-125.
Extended European Search Report for European Patent Application No. 10178909.7, dated Feb. 15, 2011.
Examiner's Office Letter (including translation) for Japanese Patent Application No. 2007-043414, mailed Jul. 7, 2010.
Search Report for European Patent Application No. 06254426.7, dated Nov. 3, 2009, 7 pages.
Official Action for U.S. Appl. No. 12/569,581, mailed Dec. 6, 2012 10 pages.
Official Action for U.S. Appl. No. 12/569,581, mailed Mar. 22, 2013 11 pages.
Official Action for Chinese Patent Application No. 201010510112.3, mailed May 6, 2013, 18 pages.
Notice of Allowance for U.S. Appl. No. 12/569,581, mailed Jun. 19, 2013, 6 pages.
Official Action with English Translation for Japan Patent Application No. 2010-216933, mailed Nov. 11, 2013 3 pages.
Official Action with English Translation for China Patent Application No. 201010510112.3, dated Jan. 9, 2014 20 pages.

\* cited by examiner

PACKET HEADERS AS A TRIGGER FOR AUTOMATIC ACTIVATION OF SPECIAL-PURPOSE SOFTPHONE APPLICATIONS

FIELD OF THE INVENTION

The invention relates generally to communications and more specifically to communication applications.

BACKGROUND

In computing, a softphone is a software program for making telephone calls over the Internet using a general purpose computer, rather than using dedicated hardware. Often a softphone is designed to behave like a traditional telephone, sometimes appearing as an image of a phone, with a display panel and buttons with which the user can interact. A softphone is usually used with a headset connected to the sound card of the PC, laptop, or the like, or with a USB phone.

Traditionally, softphone applications have had embedded support only for voice and video communication. When a specialized communication medium is required, such as Teletypewriter or Teletype (TTY), the softphone must be operated in a mode that places it in conjunction with a separate special-purpose endpoint device. It may be possible to provide embedded support for TTY into a softphone. However, if TTY communications are required, then a text chat window will need to be populated on the softphone.

SUMMARY

The use of a text chat window is not necessarily that difficult to implement. However, in order to prevent the Graphical User Interface (GUI) of the softphone from becoming unnecessarily cluttered, it is desirable that the text chat window be presented only when required, and that it remain hidden or inactive when not required.

It is also desirable only to enable communications via a certain medium to prevent the unnecessary utilization of communication hardware and network bandwidth. For example, if two communication devices are both capable of communicating via voice, video, and text, it may not be desirable to assign hardware resources for voice, video, and text at the onset of the communication session unless the participants are going to use all three media. Not only would hardware resources (e.g., ports, drivers, processors, memory, etc.) be unnecessarily consumed, but network bandwidth would also be unnecessarily consumed. It would be much more desirable to assign such resources on an as-needed basis and in response to the desires and needs of the communication session participants.

Some existing communication solutions allow users to activate the application windows manually. However, it is important to note that, in a completely manual process, participants (especially contact center agents) may not be aware that a call is from a TTY user and, therefore, may fail to enable a text window in a timely manner. Accordingly, it is one aspect of the present invention to allow an application window, such as a text window, to be activated automatically by the softphone for calls that were pre-identified as being from TTY users.

Contact center techniques exist for pre-identifying TTY callers that include requiring the callers to call into the center via a TTY-only inbound phone number and/or presenting callers with an automated attendant application that asks them to self-identify. In both cases, calls are placed in a TTY hunt group prior to their being presented to an agent. A call may be tagged as being from the TTY hunt group to automatically trigger the contact center agent's communication device to activate its text window.

The above-described automatic activation techniques still fail to solve the following problems:

(1) Softphone-equipped employees at an enterprise may receive direct-dial calls from PSTN-based TTY users, in the same way that inbound direct-dial voice calls may be received. Calls may also be transferred between employees of a contact center without traversing the TTY hunt group. In these scenarios, currently available techniques do not provide a way to activate the called party's text window automatically because there is no pre-identification of TTY users.

(2) In communication environments that support multi-mode "unified communication," people, including those with no disability-related need to use a TTY, may wish to supplement their communications with a different medium at some point during the communication session. For example, "Party A" may wish to send "Party B" a URL that cannot conveniently be sent by voice, or may simply wish to transmit something by text because voice can be overheard by people who are nearby. In these scenarios, the prior art techniques do not provide a way to automatically activate Party B's text window (or other data-appropriate application).

In response to these problems, embodiments of the present invention provide another mechanism that will cause an application and/or the application's window to open automatically.

It is one aspect of the present invention to take advantage of a "TTY-on-IP" codec that was implemented in Avaya gateways approximately six years ago. The gateway solution works in the following manner:

Rather than transport TTY signals on IP networks as in-band audio tones (which are prone to distortion in the presence of packet loss or audio compression), Avaya systems transport TTY signals as, what are in essence, verbal descriptions of the tones. The encoding format conforms to the protocol specified by IETF Standard RFC-2833. Consistent with the RFC-2833 standard, the packets have headers that identify the format of the information contained within the packet.

In accordance with at least some embodiments of the present invention, all packets that contain TTY information, that are received by a communication device from a gateway or from another communication device, will have headers that can indicate: "This packet contains TTY information." Based solely on its inspection of the packet headers, with no inspection of the packet content, a packet analyzer provided in a communication device, such as a softphone, can be user-configured to open its TTY/text window immediately and automatically upon receipt of a TTY transmission that is formatted in the above-described manner.

While certain examples will be discussed herein related to the automatic triggering of a text window and text application, one skilled in the art will appreciate that embodiments of the present invention are not so limited. More specifically, embodiments of the present invention include the general idea of utilizing packet headers as a trigger for automatic activation or de-activation of a special-purpose software application, which may or may not be implemented in conjunction with a softphone.

Illustratively, in addition to RFC-2833, industry-standard protocols that support conversational text in SIP environments include RFC-4103, RFC-4351, and RFC-5194. Detection of an RFC-4103, RFC-4351, or RFC-5194 packet header could trigger the automatic opening of a text chat window. Alternatively, or in addition, if a communication session begins as a text-based communication, the detection of a G.711, G.722, G.726, G.729, or any other voice-based packet header could trigger the automatic opening of a voice application window. Alternatively, or in addition, if a communication session begins as a non-video-based communication, the detection of a video packet header could trigger the automatic opening of a video application window. Exemplary video standards which may be followed in forming a video packet include, but are not limited to, RFC-2250, RFC-3189, RFC-4175, RFC-4421, and others.

The standards discussed above in connection with the various media types are but examples of the well-known and, in some instances, standardized codecs used today. Embodiments of the present invention are not limited to these exemplary codecs and standards should not be construed in such a manner.

In other words, the fundamental premise of the present invention can be extended beyond the automatic opening of a text chat window. For example, the receipt of a packet header that indicates video content could trigger the automatic opening of a video display window. In this scenario, initial negotiation of the communication session would serve as a confirmation that the endpoints are video-capable, but would not necessarily cause the utilization of a video-based communication session. In order to conserve screen real estate, a video window would not be opened by the communication endpoint prior to the endpoint's receipt of video packets that call for it. Although conservation of screen space is one beneficial feature obtained by implementing certain embodiments of the present invention, utilization of mechanisms described herein also include: (1) preservation of computer resources, such as CPU and memory, by not assigning them to a softphone's special applications until these resources are known to be needed and (2) conserving network bandwidth by not reserving such bandwidth for the special applications until it is known to be needed.

In accordance with at least some embodiments of the present invention, the communication endpoint might ask for the user's confirmation before opening a window automatically (e.g., "You are receiving a video transmission. Do you want to see it?").

In accordance with at least some embodiments of the present invention, inspection of the packet header alone would trigger the opening of the appropriate application and window and, simultaneously, trigger the activation of the required codec. As an example of why this might be desirable, RFC-2833 and RFC-4103 encode text differently. An endpoint would need to activate a different codec upon receipt of an RFC-2833 or RFC-4103 packet, but might nevertheless use the same text chat GUI window for both.

In accordance with at least some embodiments of the present invention, a buffer in the receiving communication device is adapted to save and allow the subsequent playback of information that was received while the special-purpose application is being enabled. Illustratively, this would ensure that the TTY character that triggered the text chat window is seen by the recipient immediately upon opening the text chat GUI window.

In accordance with at least some embodiments a method is provided that generally comprises:

establishing, at a first communication device, a communication session with a second communication device, wherein the first communication device utilizes at least a first application for communicating with the second communication device via at least a first medium, the first medium having been negotiated prior to the establishment of the communication session;

during the communication session, receiving as a part of the communication session a communication packet at the first communication device;

analyzing, by the first communication device, a header portion of the received communication packet; and based on the analysis of the header portion, invoking by the first communication device at least a second application for communicating via at least a second medium.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to automatically manage the activation and/or de-activation of communication applications.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
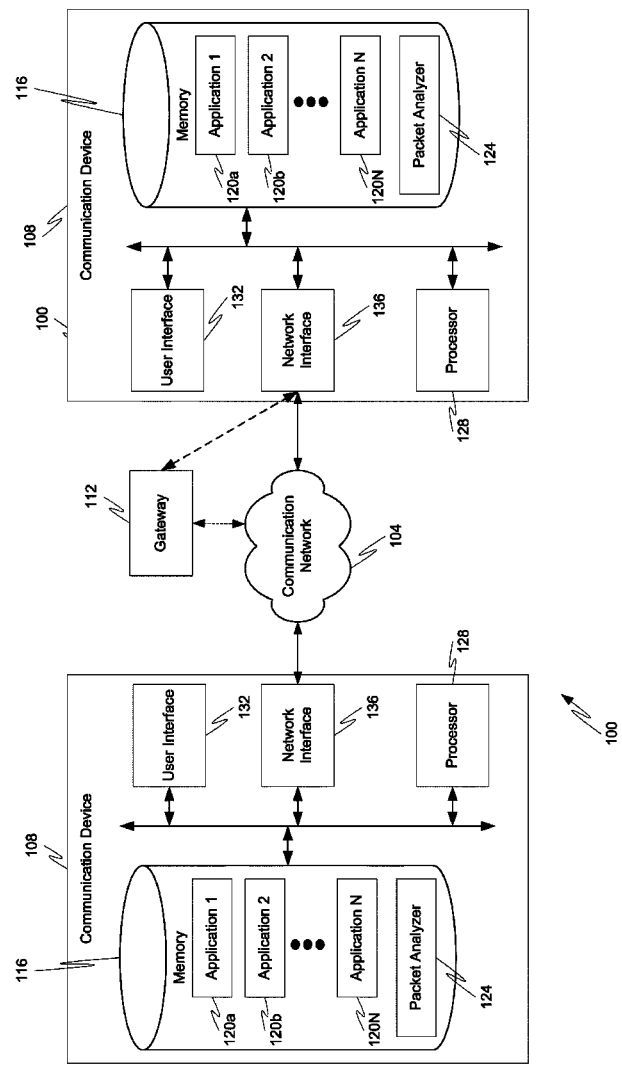
FIG. 1 is block diagram depicting a communication system in accordance with at least some embodiments of the present invention.

Referring now to FIG. 1, an exemplary communication system 100 is depicted in accordance with at least some embodiments of the present invention. The communication system 100 may comprise a communication network 104 that facilitates communications (e.g., voice, image, video, data, other non-voice media types employing protocols that support conversational text, such as those described in RFC-4103 (RTP Payload for Text Conversation), RFC-2833, RFC-4351, RFC-5194, and combinations thereof) between various communication devices 108.

The communications between communication devices 108 may be direct communications or, in some embodiments, may be facilitated by a communications server and/or switch. In other embodiments, communications between communication devices 108 may traverse one or more gateway 112, such as in a contact center configuration where one communication device 108 is operated by a contact center agent on an enterprise side of the gateway 112 and another communication device 108 is operated by a customer on the public side of the gateway 112.

The communication network 104 may be any type of known communication medium or collection of communication media and may use any type of protocols to transport messages between endpoints. The communication network 104 may include wired and/or wireless communication technologies. The Internet is an example of the communication network 104 that constitutes an IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular communication network, a satellite communication network, any type of enterprise network, and any other type of packet-switched or circuit-switched network known in the art. Generally speaking however, the communication network 104 comprises at least one packet-based communication network. In addition, it can be appreciated that the communication network 104 need not be limited to any one network type, and instead may be comprised of a number of different networks and/or network types.

The communication devices 108 may be any type of known communication or processing device such as a Digital Control Protocol (DCP) phone, VoIP telephones, Push-To-Talk (PTT) telephony devices, a computer (e.g., personal computer, laptop, or Personal Digital Assistant (PDA)) with a Computer Telephony Interface (CTI), a mobile telephone, a smart phone, or combinations thereof. In accordance with at least some embodiments of the present invention, at least one of the communication devices 108 is a softphone. The term "softphone" as used herein should be understood to include any type of device comprising a processor and memory having one or more communication applications stored thereon. The communication applications stored on the communication device 108 allow the communication device to operate and behave like a traditional phone having dedicated hardware for facilitating communications. A softphone, on the other hand, does not generally have dedicated hardware to facilitate real-time communications with other users of other communication devices. Rather, the softphone utilizes one or more of its applications to facilitate such communications. In some embodiments, the softphone may be embodied as a single device (e.g., a PC, laptop, or similar type of personal workstation) which is connected to the Internet. In other embodiments, the softphone may be embodied as multiple devices where one device comprises the communication application(s) but is connected to another simple telephone which provides the connection between the device having the application(s) and the PSTN, for example. Other configurations of softphones are well known to those skilled in the art and are, therefore, not elaborated further herein.

The communication device 108 may be controlled by or associated with a single user or may be adapted for use by many users (e.g., an enterprise communication device that allows any enterprise user to utilize the communication device upon presentation of a valid user name and password). In general the communication device 108 may be adapted to support video, audio, text, and/or data communications with other communication devices 108. The type of medium used by the communication device 108 to communicate with other communication devices 108 may depend upon the communication applications available on the communication device 108.

One or more of the communication devices 108 may comprise various components that enable it to transmit and receive packets containing voice, video, text, and/or data communications across the communication network 104. A communication device 108 may, therefore, include a memory 116 and a processor 128. As noted above, the memory 116 may include a number of applications or executable instructions that are readable and executable by the processor 128. For instance, the memory 116 may include a plurality of communication applications 120*a*-N and a packet analyzer 124.

The communication applications 120*a*-N may be specifically used by the communication device 108 for communicating via a particular medium or possibly via a different standard in the same medium. As one example, the first application 120*a* may correspond to a voice-based application, the second application 120*b* may correspond to a text-based application, and the Nth application 120N may correspond to a video-based application.

The packet analyzer 124 is provided to analyze packets received at the communication device and determine, based on the results of the analysis, whether one or more of the applications 120*a*-N should be activated and/or de-activated. The packet analyzer 124 is generally operable to analyze the contents of the header portion of packets received during a communication session. In some embodiments, the communication session has already been established and the packets received during the communication session are generally assumed to be carrying the data according to a pre-negotiated format. However, conditions may change such that during an established communication session one communication device 108 begins utilizing another communication medium as a part of the communication session, perhaps unbeknown to the other communication device 108. This newly utilized medium may cause packets of a different format to be transmitted to the other communication device 108 in a different and previously non-negotiated format. The packet analyzer 124 is capable of identifying such packets by the contents of their header and not necessarily by inspecting the data contents of the packets themselves (i.e., via a non-deep-packet inspection). Once the packet analyzer 124 identifies such a packet, the packet analyzer 124 is capable of invoking the appropriate application 120 to supplement the communication session.

In addition, the communication device 108 may comprise user interface 132 that is adapted to facilitate user control of the communication device 108 and a network interface 136 that is adapted to connect the communication device 108 to the communication network 104. The network interface 136 may comprise a communication modem, a communication port, or any other type of device or driver adapted to condition packets for transmission across the communication network 104 to a destination communication device 108 as well as condition received packets for processing by the processor 128. Examples of network interfaces 136 include, without limitation, a network interface card, a modem, a wired telephony port, a serial or parallel data port, radio frequency broadcast transceiver, a USB port, or other wired or wireless communication network interfaces.

The user interface 132 may comprise any type of known user input and/or user output technologies. For example, the user interface 132 may comprise a GUI to facilitate visual communication control of a voice communication session as well as facilitate text and video-based communication sessions. Additionally, the user interface 132 may comprise an audio interface (e.g., speaker and microphone) which allows the user to hear voice communications and project voice communications to the other communication session participants. In some embodiments the user input and user output portions of the user interface 132 may be separate and distinct. In other embodiments, the user input and user output portions of the user interface 132 may be combined, such as in a touch-screen interface.

Each application 120*a*-N may also have its own dedicated interface window or control screen that allows a user of the communication device 108 to control the application 120 and further control the communication session, or at least the medium controlled by the application 120. Thus, if multiple media are being used during a single communication session, multiple windows may be opened and displayed on the user interface 132. In accordance with at least some embodiments of the present invention, when an application is invoked during an established communication session, the interface window for that application may also be automatically displayed via the user interface 132.

Figure 2A:
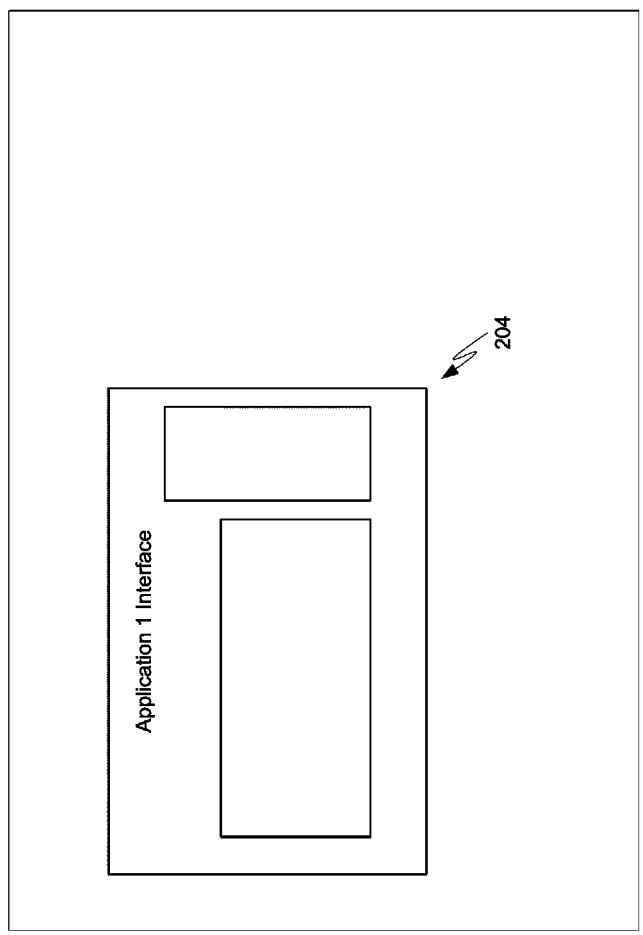
FIG. 2A is a first screen shot of a user interface in accordance with at least some embodiments of the present invention.
Figure 2B:
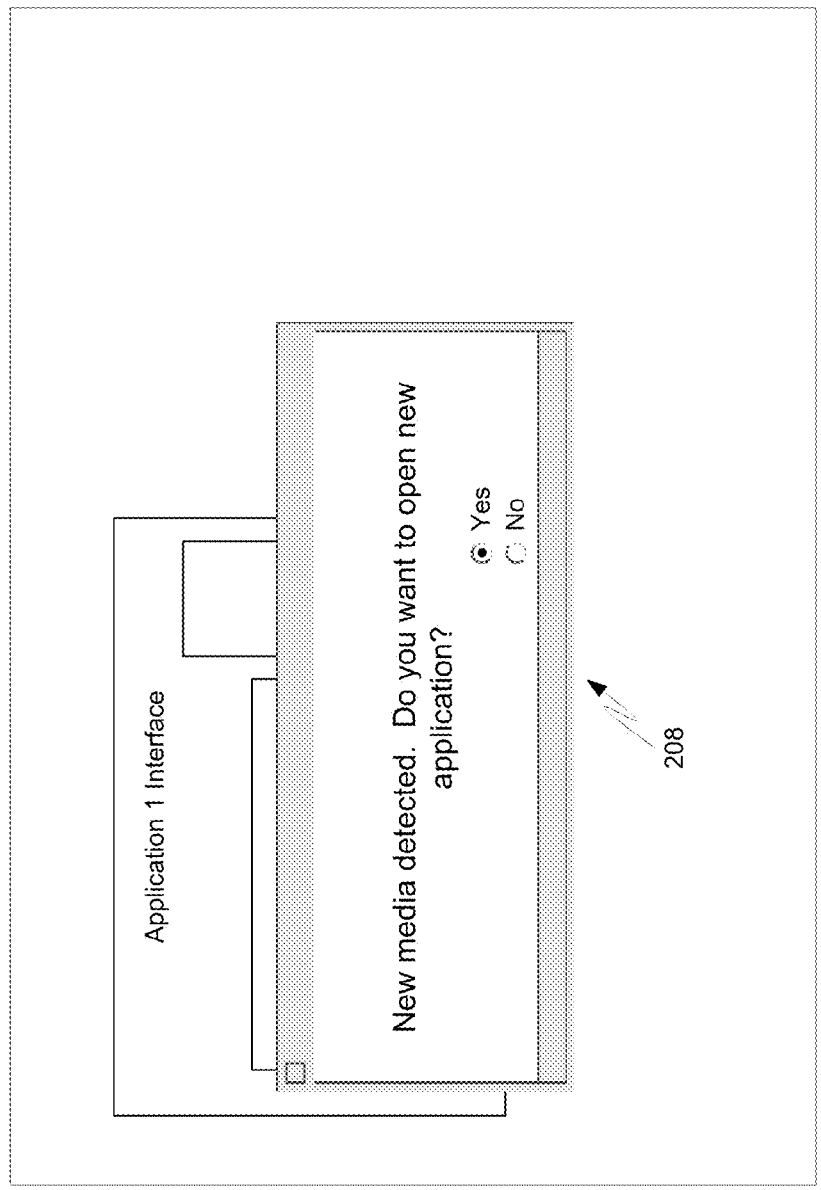
FIG. 2B is a second screen shot of a user interface in accordance with at least some embodiments of the present invention.
Figure 2C:
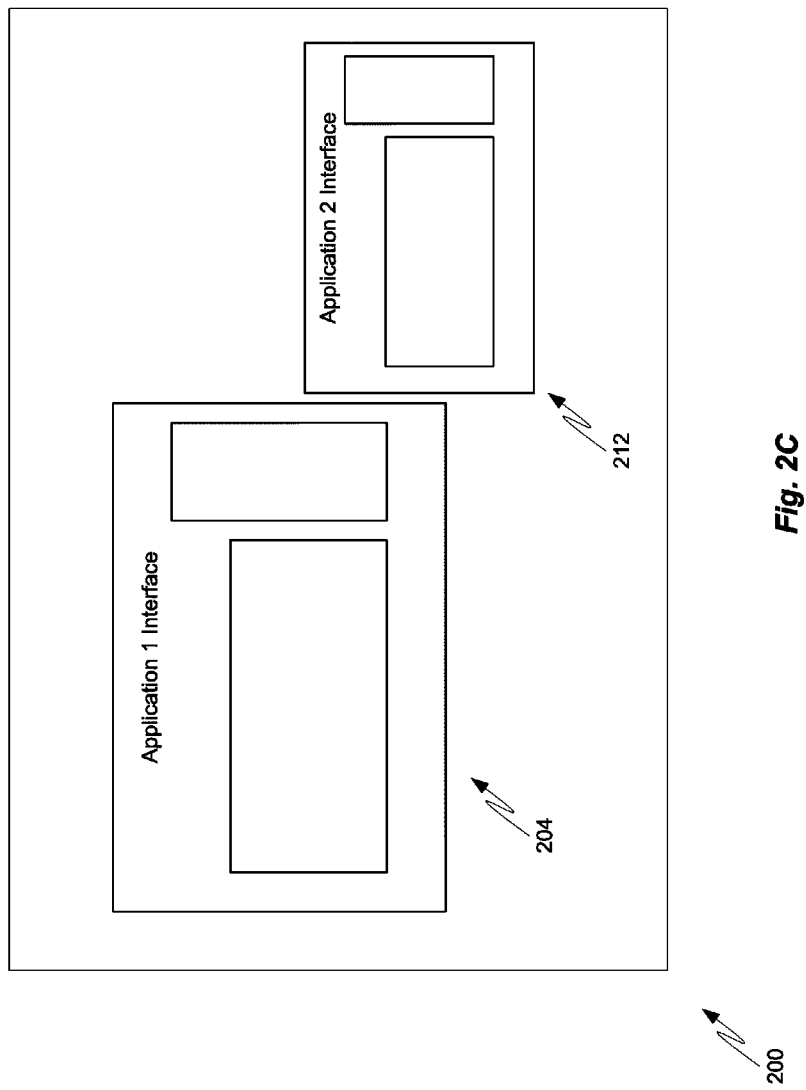
FIG. 2C is a third screen shot of a user interface in accordance with at least some embodiments of the present invention.

Referring now to FIGS. 2A-2C, an exemplary set of screen-shots of a GUI 200 will be described in accordance with at least some embodiments of the present invention. Referring initially to FIG. 2A, a first screen-shot of a GUI 200 is depicted wherein a first application interface window 204 is displayed on the GUI 200. The first application interface window 204 may correspond to the application 120 which is being used to facilitate communications via a first medium during an established communication session. The first medium may comprise one of voice, video, data, and text. Therefore, the first application interface window 204 may correspond to one of a control interface for voice communications, a video screen with a control interface, a text-chat window, or a data window.

With reference now to FIG. 2B, if a far-end user decides to begin using a second medium as a part of the communication session, the far-end user may open a second application or in some other fashion begin transmitting newly formatted packets to the other communication device 108 involved in the communication session. The newly formatted packets may be received in the data stream of the established communication session (e.g., over the same port and possibly interspersed between the packets carrying data for the first medium), but the newly formatted packets may be carrying data according to a different standard.

When the packet analyzer 124 detects such a newly formatted packet, possibly by analyzing the header of the packet and identifying that a new packet format is being used, the packet analyzer 124 may automatically identify the second medium and perform one of following two functions: (1) automatically invoking the application which facilitates communications via the second medium or (2) querying the user of the communication device 108 if they want to communicate via the second medium.

FIG. 2B depicts the scenario where a query is transmitted visually to a user of the communication device 108 via a popup window 208. One skilled in the art will appreciate that an audio query may also be utilized to ask the user if the second medium should be utilized as a part of the communication session. Exemplary audio queries may be transmitted possibly via a whisper page, interrupt, or similar type of audio communication.

If the user affirmatively responds to the query or in the event that the packet analyzer 124 automatically invokes the appropriate application, then a new application interface window 212 is presented via the user interface 132, such as is depicted in FIG. 2C. In some embodiments, the first application interface window 204 may be automatically re-sized to accommodate the new application interface window 212. In other embodiments, the new application interface window 212 may be placed partially or completely over the first application interface window 204. In other embodiments, the new application interface window 212 may be opened behind the first application interface window 204, but some other sort of audio or visual indicia may be presented to the user indicating that the new application interface window 212 has been opened.

Figure 3:
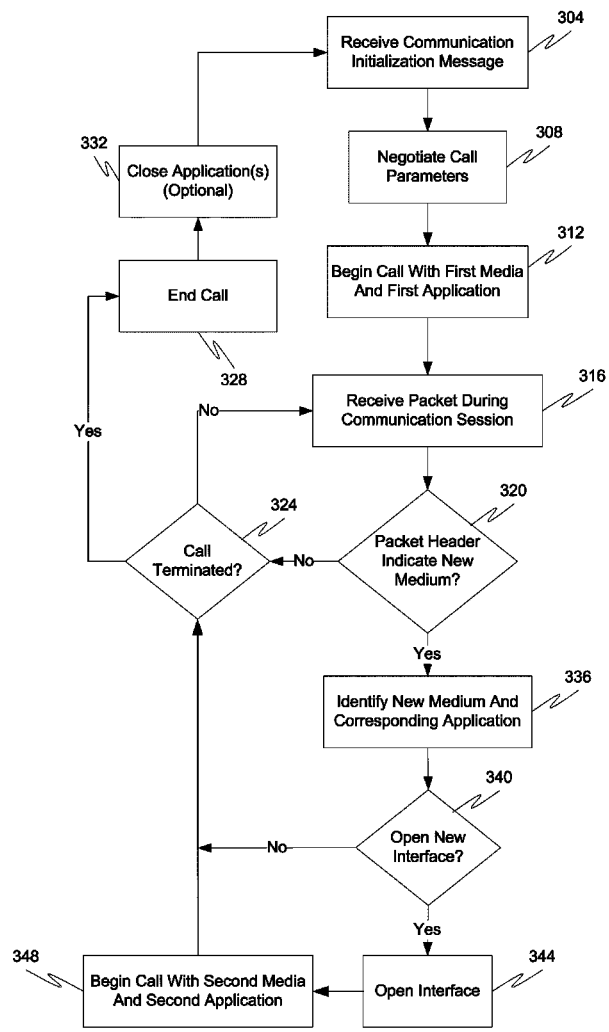
FIG. 3 is a flow diagram depicting a communication method in accordance with at least some embodiments of the present invention.

Referring now to FIG. 3, an exemplary communication method will be described in accordance with at least some embodiments of the present invention and from the perspective of a single communication device 108. One skilled in the art will appreciate that embodiments of the present invention can be equally applied to two-party communication sessions and multi-party communication sessions without departing from the scope of the present invention.

The method begins when a communication initialization message is received at the communication device 108 (step 304). The communication initialization message may include a call setup signal, an H.323 call setup message, a SIP INVITE message, or any other type of message or collection of messages used to initiate a communication session.

Thereafter, or possibly included in the communication initialization message or exchange of communication initialization messages, the communication device 108 negotiates parameters for the communication session (step 308). During this negotiation step the communication device may determine the communication capabilities of the far-end device as well as define which medium or media are to be used initially as a part of the communication session. In some embodiments, the communication devices are capable of communicating via first, second, third, and fourth media (e.g., voice, video, text, and data) but may agree to only communicate initially via one such medium. Still, the devices may share their communication capabilities to facilitate a smooth and efficient session transition to other media. For example, in some embodiments codecs for all media may be pre-negotiated even though only a single medium is being used initially. The pre-negotiation is not a requirement, however.

After the initial communication session parameters have been negotiated, the method continues with the establishment of the communication session via the first medium (step 312). In this particular example, the first medium may correspond to a voice medium. To facilitate communications via the first medium, the communication device 108 may invoke a first corresponding application which allows the user of the communication device to control the voice call.

During the established communication session the far-end communication device may begin utilizing a second communication medium. This is typically initiated by an action of a user of the far-end communication device (e.g., opening a video channel, sending a text message, sending an email, or the like). The user of the other communication device may not be aware of the far-end user's actions and may not have applications open for every possible medium that could be used during the communication session. Rather, as a part of the communication session, packets are received at the communication device 108 from the far-end device (step 316). Each of these packets may be analyzed by the packet analyzer 124 to determine if a new medium is being used (step 320). In particular, the packet analyzer 124 may analyze the header portion of the packets to determine if the packet is identifying itself as carrying data for a medium other than the first medium. Analysis of the header portion of the packet allows the packet analyzer 124 to quickly determine if a new medium is being used during the communication session. This results in the ability to support real-time or near real-time communications in a manner which minimizes the delay between detecting a new medium and invoking a new application to facilitate user communications via the new medium. This is particularly useful for far-end TTY users to ensure that the far-end user does not get the sense that they are being ignored or that the call has been dropped. It is also useful in emergency situations or other types of time-sensitive situations.

If the packet analyzer 124 determines that the received packet is only carrying data for the first medium, then the method proceeds to step 324 where it is determined if the communication session has been terminated (e.g., via detection of a communication-ending message such as a SIP BYE message, an H.323 termination message, or detection of an on-hook state)(step 324). If this query is answered negatively, then the method returns back to step 316. If this query is answered affirmatively, then the communication session is terminated (step 328). As an optional step, the application(s) which were previously opened to facilitate the communication session may be automatically or manually closed (step 332).

Referring back to the inquiry of step 320, in the event that the packet analyzer 124 detects a packet formatted to carry data for a medium other than the first medium, then the method continues with the packet analyzer 124 identifying the new medium and further identifying the application 120 which is used to facilitate communications via the new medium (step 336).

Once the packet analyzer 124 identifies the new medium and corresponding application 120, the packet analyzer 124 determines whether a new application interface window should be opened to facilitate communications via the new medium (step 340). If the packet analyzer 124 has been pre-programmed to automatically open a new application interface window upon detecting a new medium, then the method may continue invoking the application and opening its corresponding interface window (step 344). Similarly, if the packet analyzer 124 queries the user of the communication device whether they want to allow the new application interface window to be opened and the user responds affirmatively, then the new application can be invoked and the corresponding interface window may be opened. This query may also be answered affirmatively if the appropriate application is already opened and/or the corresponding application interface window is opened.

Thereafter, the communication session is allowed to continue with the new media (step 348). As can be appreciated by one skilled in the art the new media may either replace the first media or supplement the first media. In the situation where the new media supplements the first media, multiple application interface windows may be simultaneously opened on the user interface 132 or a single application interface window capable of facilitating the multi-media communication may be utilized. Thereafter, or in the event that it was decided at step 340 not to utilize the new medium, the method continues to step 324 to determine if the communication session has been terminated.

In additional embodiments of the present invention, a mega-packet that has an audio packet and a video packet bundled within a single mega-packet can be used as a way to ensure that the video and corresponding audio arrive together, are buffered together, and are presented by the receiving device together. In accordance with at least some embodiments of the present invention, if a packet is received as self-identifying the use of RFC-4351, RFC-2198 or some other packet format having multiple media types, then multiple applications may be simultaneously invoked for various different media types corresponding to the media types contained within the mega-packet.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present invention, systems, apparatuses and methods for managing communication applications. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   establishing, at a first communication device, a communication session with a second communication device, wherein the first communication device utilizes at least a first application for communicating with the second communication device via at least a first medium, the at least a first medium having been negotiated prior to the establishment of the communication session;
   during the communication session, receiving as a part of the communication session a communication packet at the first communication device;
   analyzing, by a packet analyzer, a header portion of the received communication packet, wherein the packet analyzer is provided in the first communication device; and
   based on the analysis of the header portion, invoking by the first communication device at least a second application for communicating via at least a second medium, wherein the second application that supports the second medium is installed on the first communication device and the second communication device;
   querying a user of the first communication device as to whether or not the first user desires to invoke the second application; and
   invoking the second application only in the event that an affirmative response to the query is received from the user.

2. A first communication device, comprising a tangible, non-transitory computer readable medium having computer executable instructions stored thereon which, when executed by a processor of the first communication device, cause the processor to execute the computer executable instructions, comprising:
   a first application which facilitates communications via at least a first medium; and
   a second application which facilitates communications via at least a second medium; and
   and a packet analyzer adapted to analyze header portions of communication packets received during an established communication session between the first communication device and a second communication device and determine, based on the analysis of the header portions, whether to invoke one or both of the first and second applications for the communication session after the communication session has been established, wherein the packet analyzer is provided in the first communication device, and wherein second application that supports the second medium is installed on the first communication device and the second communication device;
   wherein use of the first medium for the communication session was negotiated during the establishment of the communication session, wherein the first application was invoked during the establishment of the communication session, wherein the second medium was not negotiated during the establishment of the communication session, and wherein the packet analyzer determines whether to invoke the second application after the communication session has been established;
   and wherein the second application is automatically invoked by the first communication device without querying a user of the first communication device and wherein contents of the received communication packet are automatically presented to the user of the first communication device via the second application.

3. A non-transitory computer program product comprising computer executable instructions stored onto a computer readable medium which, when executed by a processor of a computer, cause the processor to execute a method, the method comprising:

receiving a communication packet in a first communication medium as a part of and during an established communication session between a first communication device and a second communication device;

analyzing only a header portion of the communication packet; and based on the analysis of the header portion, invoking a communication application to facilitate communications via a second communication medium, wherein the second communication medium on the computer was not originally utilized at the establishment of the communication session, and wherein the communication application that supports the second communication medium is installed on the first communication device and the second communication device;

wherein the received communication packet includes data formatted according to a communication standard for the second communication medium and wherein the header describes at least one of a portion of the data and the communication standard.

4. The non-transitory computer program product of claim 3, wherein the header describes the communication standard.

5. A method, comprising:

establishing, at a first communication device, a communication session with a second communication device, wherein the first communication device utilizes at least a first application for communicating with the second communication device via at least a first medium, the first medium having been negotiated prior to the establishment of the communication session;

during the communication session, receiving as a part of the communication session a communication packet at the first communication device;

analyzing, by a packet analyzer, a header portion of the received communication packet, wherein the packet analyzer is provided in the first communication device;

based on the analysis of the header portion, invoking by the first communication device at least a second application for communicating via at least a second medium, wherein the second application that supports the second medium is installed on the first communication device and the second communication device; and wherein the second application is automatically invoked by the first communication device without querying a user of the first communication device and wherein contents of the received communication packet are automatically presented to the user of the first communication device via the second application.

\* \* \* \* \*

UNITED STATES PATENT AND TRADEMARK OFFICE
CERTIFICATE OF CORRECTION

PATENT NO. : 9,516,069 B2
APPLICATION NO. : 12/620428
DATED : December 6, 2016
INVENTOR(S) : Francis C. Hymus, Paul Roller Michaelis and Richard Alan Windhausen Page 1 of 1

It is certified that error appears in the above-identified patent and that said Letters Patent is hereby corrected as shown below:

In the Claims

At Column 12, Line 35, please delete "and" therein.

At Column 12, Line 37, please delete "and" therein.

Signed and Sealed this
Ninth Day of May, 2017

Michelle K. Lee
*Director of the United States Patent and Trademark Office*